(12) United States Patent
Grohs

(10) Patent No.: US 6,386,092 B1
(45) Date of Patent: May 14, 2002

(54) ELECTRIC GRILL-GRILLPAN WITH ADJUSTABLE COOKING SURFACES

(76) Inventor: Robert Grohs, 18417 Tranquil La., Olney, MD (US) 20832

(*) Notice: Subject to any disclaimer, the term of this patent is extended or adjusted under 35 U.S.C. 154(b) by 0 days.

(21) Appl. No.: 09/726,440

(22) Filed: Dec. 1, 2000

Related U.S. Application Data (60) Provisional application No. 60/232,435, filed on Sep. 14, 2000.

(51) Int. Cl.$^7$ .................................................. A47J 37/10
(52) U.S. Cl. ............................ 99/339; 99/340; 99/423; 99/448
(58) Field of Search ...................... 99/422, 423, 425, 99/445, 340, 339, 448

(56) References Cited

U.S. PATENT DOCUMENTS

| | | | |
|---|---|---|---|
| 4,800,865 A | 1/1989 | Setzer | 126/21 R |
| 5,465,654 A | 11/1995 | Lampi et al. | 99/422 |
| 5,579,680 A | 12/1996 | Graur | 99/401 |
| 5,606,905 A | 3/1997 | Boehm et al. | 99/375 |
| 5,829,361 A | 11/1998 | Richter | 99/422 |
| 5,845,562 A | 12/1998 | Deni et al. | 99/375 |
| 5,967,022 A | * 10/1999 | Moschella | 99/339 |
| 6,016,741 A | 1/2000 | Tsai et al. | 99/341 |

FOREIGN PATENT DOCUMENTS

| | | | | |
|---|---|---|---|---|
| DE | 3624283 | * | 1/1988 | 99/422 |
| EP | 0091145 | * | 10/1983 | 99/422 |
| EP | 0623303 | * | 11/1994 | 99/422 |
| GB | 2127280 | * | 4/1984 | 99/422 |

* cited by examiner

*Primary Examiner*—Reginald L. Alexander
(74) *Attorney, Agent, or Firm*—Law Offices of Royal W. Craig

(57) ABSTRACT

An electric grill comprising a large planar surface with shallow sides defining a first cooking surface and an adjustable grillpan carrying a second cooking surface. The first cooking, surface is smooth and flat suitable for cooking or grilling foods. The second cooking surface comprises a plurality of parallel ribs along its surface, and is adapted for grilling foods. Sloped channels between the ribs carry grease away from the food while it cooks. A reservoir on the downside of the sloping surface collects the run-off. The parallel ribs are flat on top but are deeper as the channels approach the reservoir. Placement of the grillpan within the structure comprising the first cooking surface generates three separate cooking compartments. Juices from different foods cooked simultaneously on the three respective grill surfaces are thereby prevented from mixing. The grillpan slides laterally in either direction over the first cooking surface, whereby the dimensions of the individual cooking compartments may be changed. A thermostat control dial and on/off control enable the user to select a desired temperature for the cooking surfaces depending on the requirements of the food being cooked. The separate cooking surfaces of the grill enable the user to simultaneously prepare large portions of as many as three different foods without sacrificing any loss of flavor as a result of unwanted mingling of juices.

17 Claims, 5 Drawing Sheets

ELECTRIC GRILL-GRILLPAN WITH ADJUSTABLE COOKING SURFACES

CROSS-REFERENCE TO RELATED APPLICATIONS

The present application is based on U.S. provisional application (Ser. No. 60/232,435) filed on Sep. 14, 2000 by Robert Louis Grohs for his "SLIDING GRILL-PAN FOR COOKING (INDOOR)".

BACKGROUND OF THE INVENTION

1. Field of the Invention

The present invention relates to cookware and in particular to an electric grill comprising grilling, cooking, and frying surfaces. The device is configured to allow the dimensions of the cooking surfaces to be conveniently adjusted to accommodate varying quantities and types of foods.

2. Description of the Background

A market exists for portable indoor cooking devices, and a number of indoor grill configurations have sprung up to satisfy this demand. Indoor cooking grills are characterized by a heated cooking surface within a compact design which facilitates portability. Most indoor grills use electricity to cook. One design prevalent in the background art incorporates a clam-shell type hinged lid comprising an upper and lower cooking surface. In the closed position both surfaces cook the food. U.S. Pat. No. 5,845,562 to Deni et al. teaches one such device. The grill comprises a top and bottom cooking surface having a centrally positioned hinge component for lifting or closing the lid. The cooking surfaces comprise a plurality of rounded ribs and channels which drain greases and other liquids from the food. Other indoor grills incorporate distinguishing features such as heating chambers for buns or rolls. U.S. Pat. No. 6,016,741 to Tsai et al. shows an indoor grill having a top and bottom cooking surface in one chamber for cooking foods, which lies beneath a second chamber provided for warming buns or rolls. Both cooking chambers are accessible by opening a clam shell-like hinged lid.

U.S. Pat. No. 5,606,905 to Boehm, et al. discloses a hinged grilling apparatus comprising upper and lower cooking surfaces. A vapor chamber is formed when the lid is sealed closed over the food. The bottom cooking surface is inclined to remove grease and other liquids emanating from the foodstuffs out of the cooking chamber and into a detachable collection plate.

Unfortunately each of the above grills is hampered by the miniature size of their cooking surfaces. To maintain portability, and conserve counter or table space while in use, and facilitate the opening and closing of the hinged lid, it has been necessary to sacrifice the dimensions of the cooking surfaces on these grills. The result has been that indoor grills are unsuitable for preparing foods for more people or more types of food using one unit. When preparing foods on an indoor grill, the cook is forced to make smaller amounts of food at a time which increases the overall cooking time, and requires the host to serve the food in waves, rather than serving everyone at once.

A further difficulty with indoor grills is found in the limited types of grill surfaces available. Flat griddle-like surfaces are useful for frying foods, such as eggs, potatoes, or pancakes. By contrast, a ribbed surface is better for grilling foods like meats. The ribbed surface more closely approximates an outdoor grilling arrangement and channels between the ribs carry away grease and fats which drain from meats while cooking. Lacking in the background art is an indoor grill for cooking which comprises both types of cooking and grilling surfaces in one grill.

It would therefore be advantageous to have an indoor cooking grill which incorporates both grilling and cooking surfaces in a configuration that is large enough to prepare sufficient quantities of various foodstuffs at the same time, and which is economical to manufacture and easily cleaned. It would further be advantageous to have a grill with separate cooking surfaces so that the juices from the different foodstuffs are unable to mix while cooking, thereby preserving the individual flavor of each food. Finally, it would be advantageous to incorporate a temperature control mechanism whereby the temperature of the cooking surfaces may be selected from a range of settings.

SUMMARY OF THE INVENTION

It is therefore a primary object of the present invention to provide an electric indoor cooking grill which enables the user to simultaneously cook different foods within separate compartments on the same grill without mixing the juices and therefore the flavors, of the foods.

It is another object of the present invention to provide a large flat cooking surface defining a first primary cooking surface enclosed by a shallow retaining wall.

It is still another object of the present invention to provide a smaller detachable ribbed grilling surface defining a second cooking surface housed in a pan which can be seated on top of the first cooking surface thereby yielding three separate cooking surfaces.

It is yet another object of the present invention to enable the second ribbed grilling surface to slide laterally over the first flat cooking surface thereby changing the dimensions of the cooking compartments on the first cooking surface.

It is a further object of the present invention to channel grease, released while cooking meats, into a collection reservoir by incorporating a plurality of sloping channels on the second cooking surface.

It is still another object of the present invention to supply an integral electric heat source to the first cooking surface.

It is yet another object of the present invention to transmit heat from the first cooking surface into and through the second grilling surface.

It is a further object of the present invention to regulate the temperature of the first cooking surface by means of an attachable thermostat control which additionally functions to turn the device on and off.

It is still further an object of the present invention to provide a stable one-piece base structure of a heat resistant plastic which elevates the first cooking surface.

These and other objects are accomplished by a portable electric grill comprising four elements: a stable base; a large flat pan defining a first grilling surface and comprising an integral electric heat source; an adjustable grillpan defining a second cooking surface; and a power cord with an integral temperature control dial. The first cooking surface comprises a large flat surface area bounded by four shallow sides, giving the appearance of a large shallow pan. The first cooking surface rests on top of a base platform of heat resistant plastic. The base is a unitary structure comprising four legs, a horizontally disposed platform frame, and a shallow retaining wall which circumscribes three sides of the frame. The first cooking surface houses all electric socket connector which mates with a unit carrying a temperature control dial. The temperature control unit further comprises a length of electrical cord and plug suitable for use in an A/C power source. The second cooking surface is housed within a smaller pan of a dimension which enables it to fit snugly within the pan defined by the first cooking surface. So arranged, two sides of the grillpan contact parallel sides of the larger pan comprising the first cooking surface. The contacting sides and bottom thereby fit together to prevent the mixture of food juices between the compartments while cooking. Further, the grillpan divides the first cooking surface, yielding three available cooking surfaces. One surface lies on each side of the grillpan, with the grillpan itself comprising the third available cooking surface. The grillpan slides laterally over the first cooking surface, thereby changing the dimensions of the cooking compartments. Further, the cooking surface in the grillpan comprises a series of parallel ribs and sloping channels which facilitate the draining of grease or liquids when meats and other foods are grilled.

Other objects, features, and advantages of the present invention will become more apparent from the following detailed description of the preferred embodiments and certain modifications thereof.

DETAILED DESCRIPTION OF THE PREFERRED EMBODIMENTS

Figure 1:
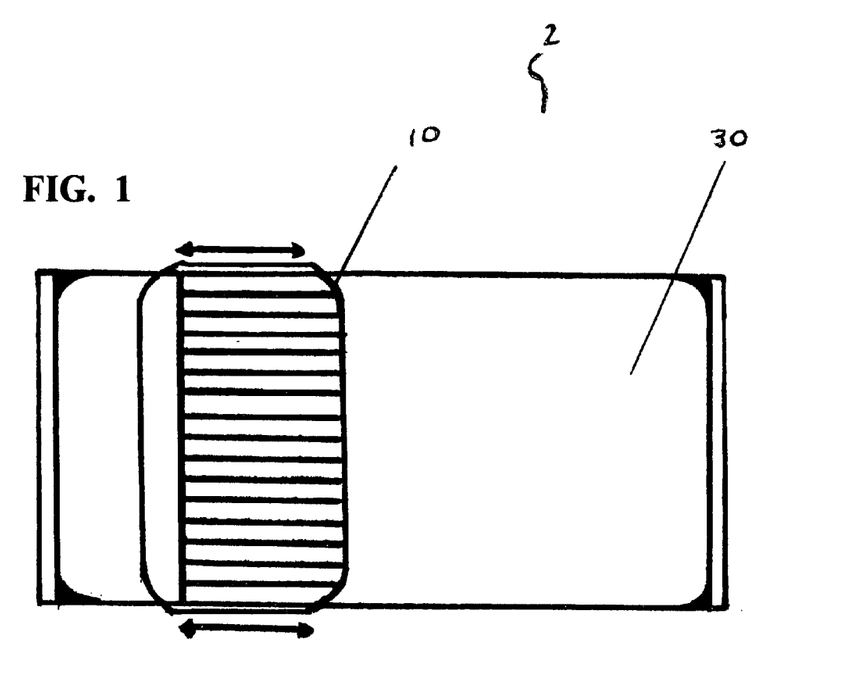
FIG. 1 is a top view of the assembled grill.
Figure 2:
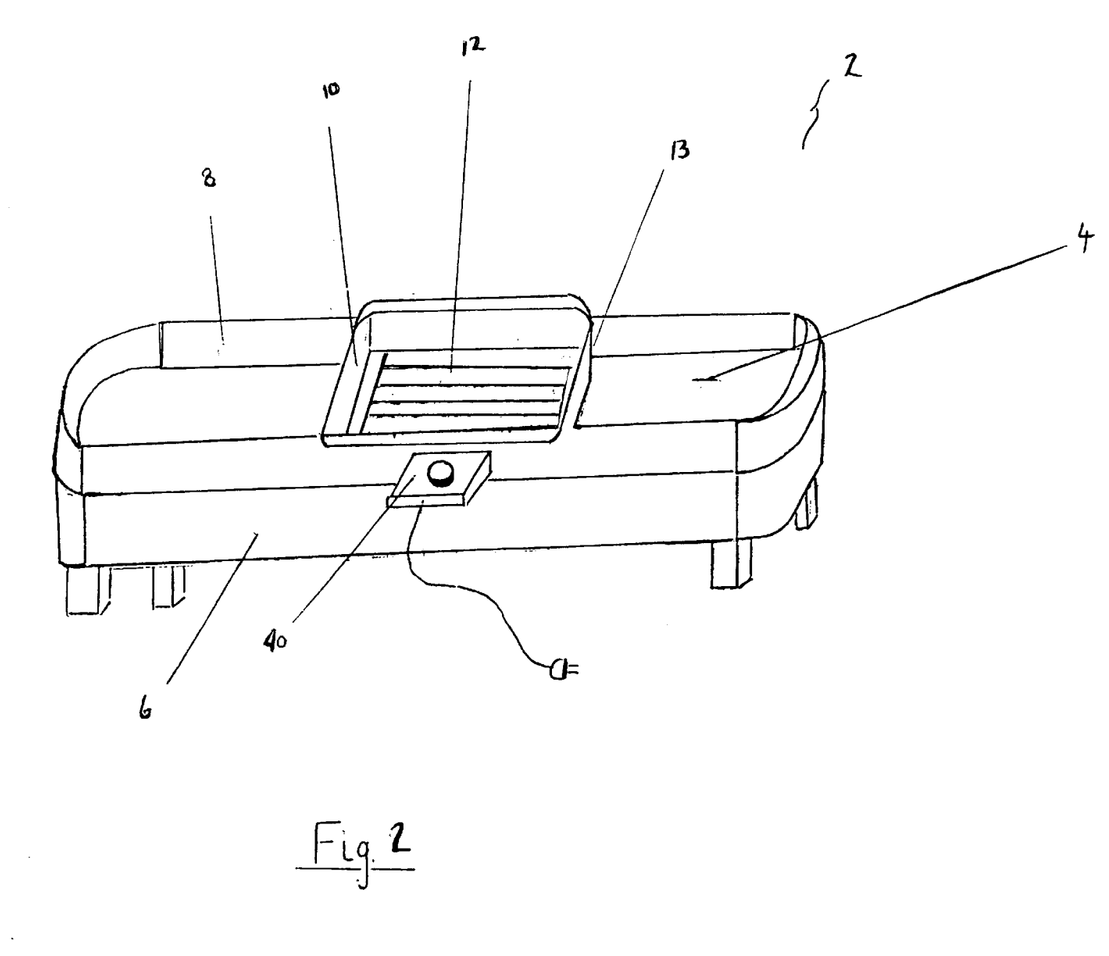
FIG. 2 is a perspective view of the grill and grillpan in a fully assembled configuration.
Figure 3:
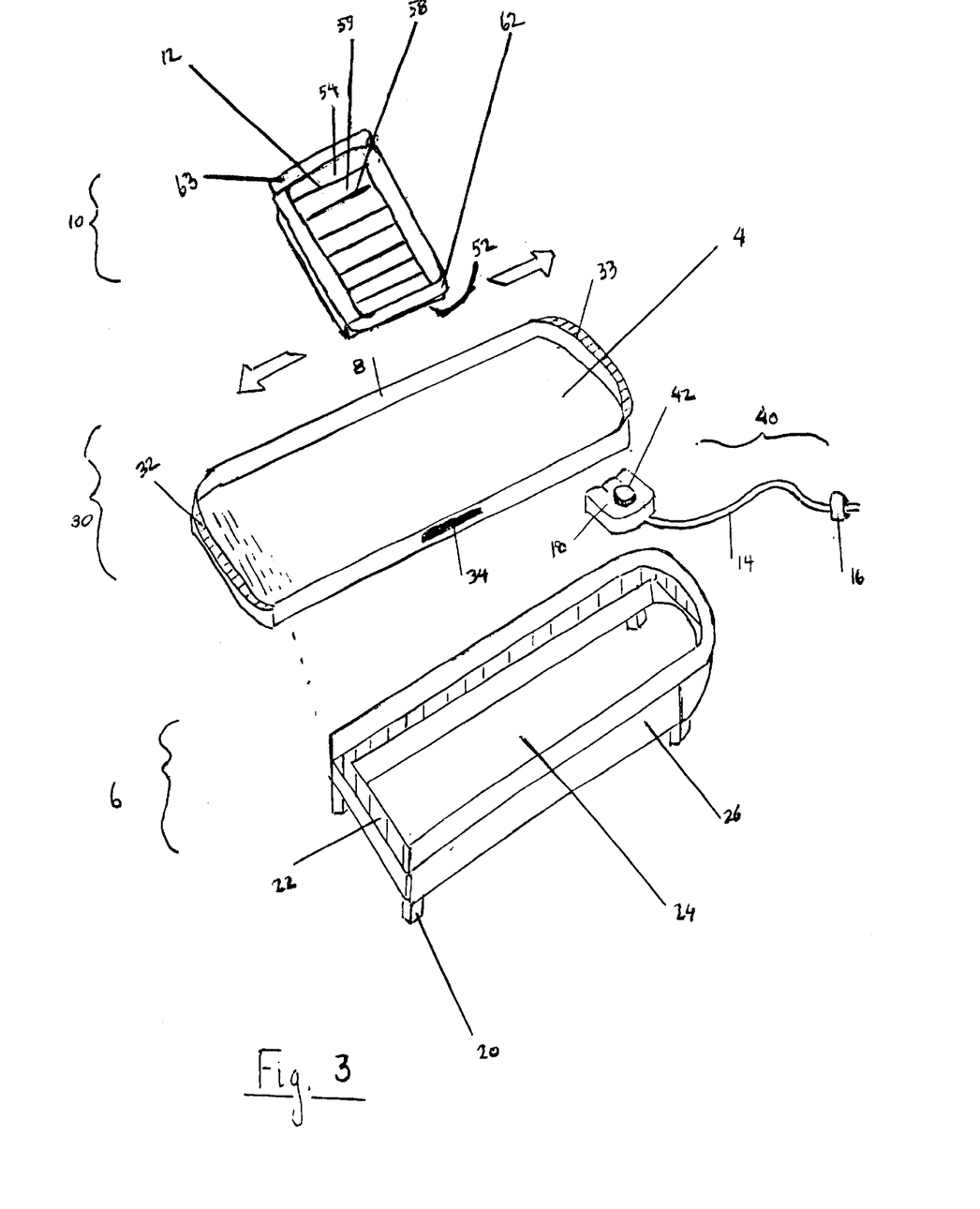
FIG. 3 is an exploded view of the grill components.

With reference to the drawings, the assembled grill 2 of FIG. 2 includes a primary cooking surface 4 enclosed within a shallow retaining wall 8 and elevated by a base platform 6. Together the primary cooking surface 4 and the shallow retaining wall 8 comprise the primary cooking unit 30 as shown in FIG. 3. Centrally positioned within the primary cooking unit is a grillpan 10 carrying the secondary cooking surface 12. A temperature regulating device 40 attaches to one side of the primary cooking unit 30.

Figures 4, 5:
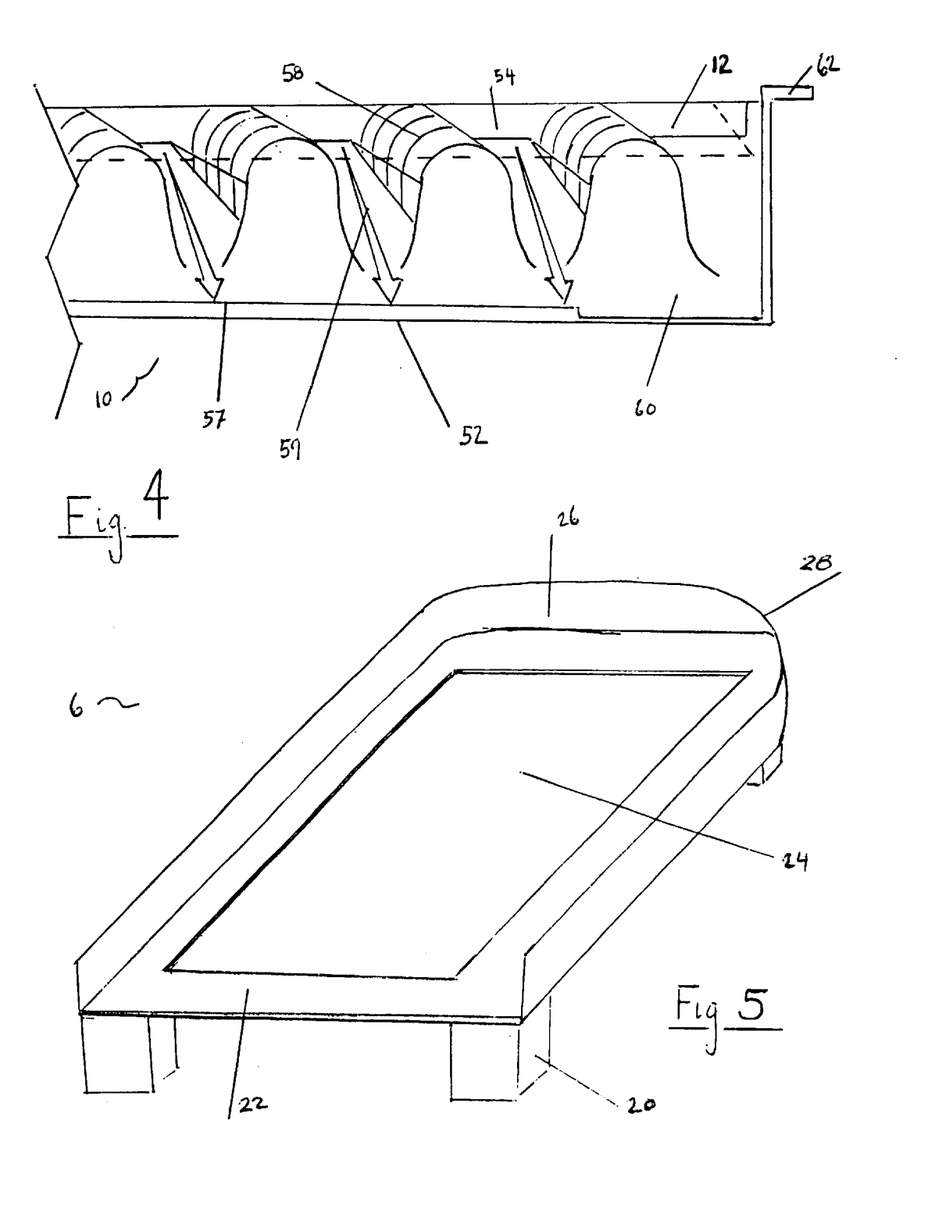
FIG. 4 is a side sectional view of a portion of the grillpan enlarged to show the ribbed cooking surface, the sloping channels, and the terminal reservoir.
FIG. 5 is a front perspective view of the base platform.
Figure 4:
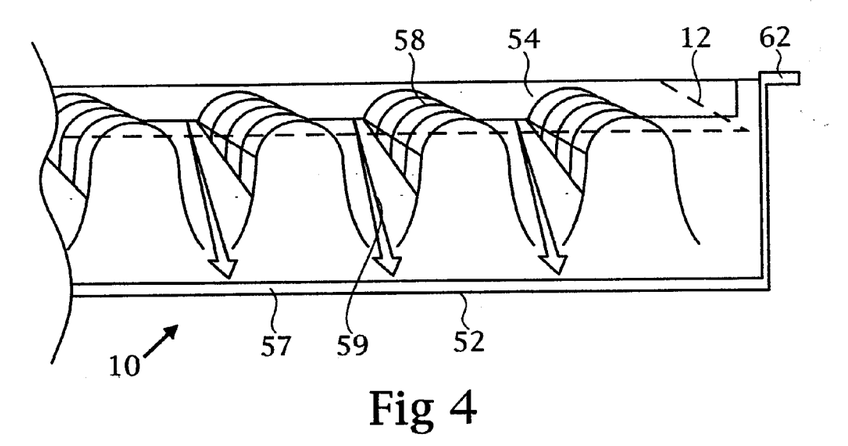
Figure 5:
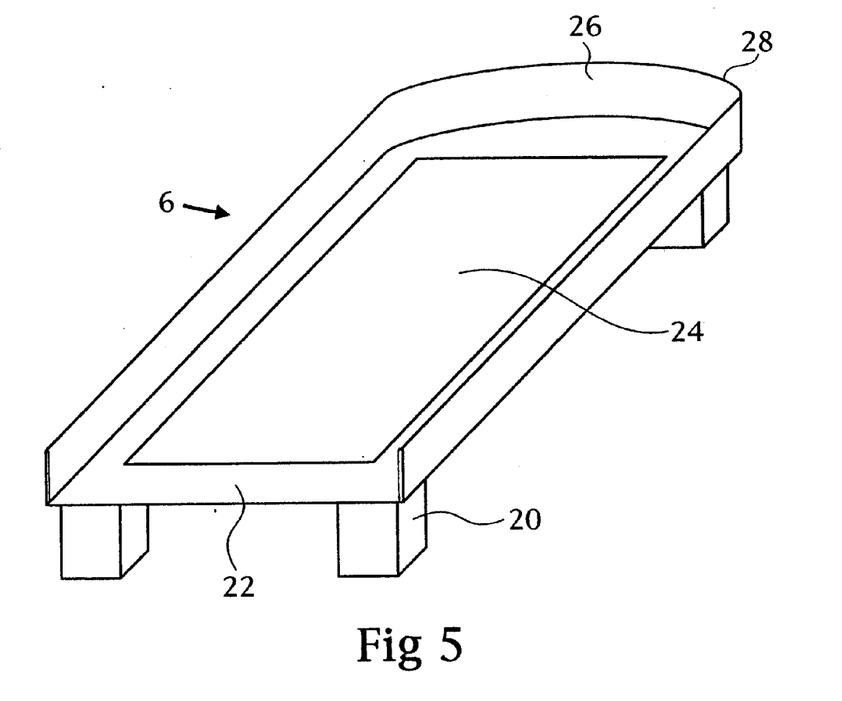

Referring to FIG. 3, the exploded view shows how the components of the grill are assembled. The base platform 6 defines the bottom component of the grill which rests on the table or counter-top surface. Legs 20 extending from each corner stabilize the platform. As best seen in FIG. 5, a horizontally disposed platform 22 defines the bottom surface of the base. The center portion 24 of the horizontal platform is open to allow dissipation of heat from the grill. A shallow retaining wall 26 circumscribes three sides of the platform and comprises curved corners 28 on the closed end. The opposite side remains open for easy access enabling the primary cooking unit to slide into the recess defined by the retaining wall above the platform. The base thereby provides stability and secures the cooking unit during use.

Referring again to FIG. 3, the primary cooking unit 30 comprises the primary cooking surface 4 enclosed on four sides by a shallow retaining wall 8. The unit 30 is preferably of a cast aluminum construction, and comprises the shape of a parallelogram having rounded corners. The cast aluminum construction incorporates two handles 32, 33 which extend from the top margin of opposite sides which comprise the width dimension of the unit 30. A conventional socket 34 for plugging in the temperature regulating device 40 is housed along one side of the unit. The temperature regulating device 40 comprises an electrical cord 14 extending from a temperature control unit 18 and terminates in a plug 16 adaptable for use in a standard A/C power outlet. A dial mechanism 42 attached to the temperature control unit 18 comprises a range of temperatures which may be selected depending on the requirements of the food being cooked.

Figure 6:
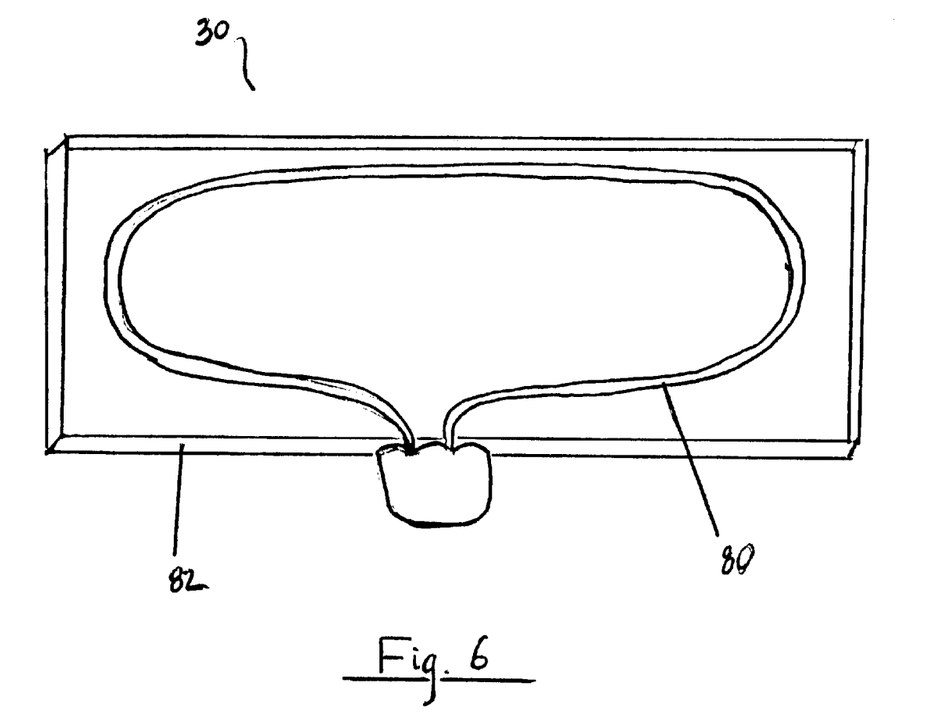
FIG. 6 is a breakaway view of the primary cooking unit showing the placement of the integral heating unit.

As shown in FIG. 6, an integral heating element 80 is incorporated into the primary cooking unit 30, and lies beneath the primary cooking surface 4 (as shown in FIG. 3). The heating element 80 comprises a resistive heat-generating conductor housed within a hollow vessel 82 integrally molded into the bottom of the primary cooking unit 30.

Referring again to FIG. 3, the final element shown is a grillpan 10 having a cast aluminum construction comprising a size and shape which enables it to fit within the primary cooking unit 30, and rest on top of the primary cooking surface 4. The grillpan 10 comprises the shape of a parallelogram defined by a flat or slightly concave horizontally disposed bottom surface 52 having four vertically disposed shallow sides 54, and rounded corners. The overall appearance is of a shallow pan. As shown in the enlarged view of the grillpan represented by FIG. 4, a second cooking surface 12 lies within the grillpan 10. The cooking surface 12 is adapted for grilling, and comprises a plurality of evenly spaced parallel ribs 58. Channels 59 lie between the elevated ribs, and function to drain grease away when cooking meats or other foods with high grease content. The channels 59 terminate in a common channel 57 which runs perpendicularly to the plurality of channels 59. The common channel 57 serves as a reservoir for the run-off from the plurality of channels 59. The ribs 58 form a level cooking surface within the grillpan 10 which secures foods, particularly round foods like hot dogs or sausages which are subject to rolling around while cooking. Draining fats is accomplished by sloping the channels 59 between the ribs rather than sloping the whole cooking surface 12. The channels 59 are shallow along the wall opposite the grease reservoir and increase in depth as they approach the side comprising the reservoir. The channels thereby comprise slopes which facilitate the removal of grease. Handles 62, 63 (the latter not visible in FIG. 4) are cast into the sides of the grillpan to facilitate its removal from the grill.

In operation of the above-described device, it will be seen from FIG. 2 that the grillpan 10 fits close together within the primary cooking unit 30. With the grillpan removed from the primary cooking surface, the user is presented with a single large cooking surface, and by placing the grillpan on a conventional electric element or gas burner, the grillpan offers yet another cooking surface. In place, the grillpan divides the primary cooking surface into two cooking surfaces as shown in FIG. 2. The grilling surface 12 within the grillpan 10 comprises a third distinct cooking surface. The grillpan acts as a fixed grilling surface if left stationary on the primary cooking surface. In addition, the user may slide the grillpan 10 laterally over the primary cooking surface to change the dimensions of the sub-divided cooking areas. As further seen in FIG. 2, contact between the sides of the grillpan 10 and the sides of the primary cooking unit 30 fits together to prevent the movement of cooking juices between the separate cooking surfaces.

The assembled grill 2 as constructed and used as described above conveniently provides both grilling and cooking surfaces on the same apparatus. The cooking surfaces may further be configured to provide three separate cooking compartments. So arranged, the grill enables the cook to simultaneously prepare as many as three different foods on the same grill without concern that the juices, and thereby the flavors of the foods, will inter-mix. The grilling surface further promotes a healthier cooking method as channels within the surface drain fats and grease away from food as it cooks.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. An electric grill, comprising:
   a primary unit defining a first cooking surface;
   an adjustable grillpan defining a second cooking surface that is smaller than said first cooking surface and is slidably seated thereon;
   an internal heating element housed within said primary unit;
   temperature regulating means for regulating the temperature of said first cooking surface;
   wherein the grillpan comprising the second cooking surface may be moved within the primary unit thereby dividing the first cooking surface and forming three distinct cooking surfaces on which different food items may be simultaneously, yet separately cooked.

2. The electric grill as recited in claim 1, wherein the primary unit comprises the shape of a parallelogram with rounded corners defined by four shallow walls which enclose the planar first cooking surface, is of a molded cast aluminum or other metal, and further comprises a shape adapted to receive the grillpan as recited in claim 1.

3. The electric grill as recited in claim 1, wherein said primary unit is adapted to receive said grillpan in a configuration wherein two opposite sides of the grillpan contact two opposite walls of the primary cooking unit, and accommodate the lateral sliding of said grillpan over the first cooking surface.

4. The electric grill as recited in claim 1, wherein the grillpan is of a cast aluminum material having the shape of a parallelogram with rounded corners, and is detachable from the primary cooking unit.

5. The electric grill as recited in claim 1, wherein said internal heating element transfers heat from the primary cooking unit into said grillpan when said grillpan is placed within said primary unit.

6. The electric grill as recite in claim 1, wherein said grillpan act as a fixed surface if left stationary of the primary surface.

7. The electric grill as recited in claim 1, wherein said grillpan is detachable from the primary unit and acts as a separate grilling surface, thereby increasing total available cooking area, when placed over an electric element or a gas burner.

8. The electric grill as recited in claim 1, wherein said grillpan is a sliding and adjustable grilling surface depending on cooking requirements.

9. The electric grill as recited in claim 1, said grillpan having a level top surface comprising a plurality of ribs lying parallel to each other and spaced apart evenly, said ribs separated by sloping channels directed downwardly toward a common channel lying perpendicularly thereto which serves as a reservoir.

10. The electric grill as recited in claim 1, wherein the temperature regulating means further comprises an integral electric cord and plug for attachment to an A/C outlet, a temperature control unit which may be plugged into a socket housed on one side of the primary unit, and further comprises a dial corresponding to a range of temperature settings.

11. An electric grill, comprising:
    a primary unit defining a first cooking surface;
    an adjustable grillpan defining a second cooking surface, said second cooking surface being smaller in size than said first cooking surface and slidably seated thereon to allow for simultaneous, yet separate, use of said first and said second surfaces during cooking;
    an internal heating element housed within said primary unit;
    temperature regulating means for regulating the temperature of said first cooking surface; and
    a unitary base structure comprising four legs each positioned at a corner of a horizontally disposed platform frame, said horizontally disposed frame being open in the center and bounded on three sides by a vertically disposed shallow retainer wall, said shallow retainer wall having curved corners,
    wherein the primary cooking unit of the grill is secured while cooking.

12. The electric grill as recited in claim 11, wherein said primary unit is adapted to receive said grillpan in a configuration wherein two opposite sides of the grillpan contact two opposite walls of the primary cooking unit, and accommodate the lateral sliding of said grillpan over the first cooking surface.

13. The electric grill as recited in claim 11, wherein the grillpan is of a cast aluminum or other metal and comprises a level top surface having a plurality of ribs lying parallel to each other and spaced apart evenly, said ribs separated by sloping channels directed downwardly toward a common channel lying perpendicularly thereto which serves as a reservoir.

14. The electric grill as recited in claim 11, wherein said internal heating element transfers heat from the primary cooking unit to said grillpan when said grillpan is placed within said primary unit.

15. The electric grill as recited in claim 11, wherein said temperature regulating means comprises an integral electric cord and plug for attachment to an A/C outlet, a temperature control unit which may be plugged into a socket housed on one side of the primary unit, and further comprises a dial corresponding to a range of temperature settings.

16. An electric grill, comprising:
    a primary unit defining a first cooking surface;
    a detachable grillpan defining a second cooking surface, said primary unit being adapted to accommodate lateral sliding of said grillpan over said first cooking surface;
    an internal heating element housed within said primary unit;
    temperature regulating means for regulating the temperature of said first cooking surface;
    wherein the detachable grillpan comprising the second cooking surface may be placed within the primary unit thereby dividing the first cooking surface and forming three distinct cooking surfaces on which different food items may be simultaneously, yet separately cooked.

17. The electric grill as recited in claim 16, wherein the temperature regulating means comprises an integral electric cord and plug for attachment to an A/C outlet, a jack which may be plugged into a port housed on one side of the primary unit, and further comprises a dial corresponding to a range of temperature settings.

* * * * *

UNITED STATES PATENT AND TRADEMARK OFFICE
CERTIFICATE OF CORRECTION

PATENT NO. : 6,386,092 B1
DATED : May 14, 2002
INVENTOR(S) : Robert Grohs

It is certified that error appears in the above-identified patent and that said Letters Patent is hereby corrected as shown below:

Title page,
The title page should be deleted to appear as per attached title page.

Drawings,
The sheets of drawings consisting of figures 1-6 should be deleted to appear as per attached figures.

Signed and Sealed this

Nineteenth Day of November, 2002

Attest:

Attesting Officer

JAMES E. ROGAN
Director of the United States Patent and Trademark Office

United States Patent
Grohs (12) 
(10) Patent No.: US 6,386,092 B1
(45) Date of Patent: May 14, 2002

(54) ELECTRIC GRILL-GRILLPAN WITH ADJUSTABLE COOKING SURFACES

(76) Inventor: Robert Grohs, 18417 Tranquil La., Olney, MD (US) 20832

(*) Notice: Subject to any disclaimer, the term of this patent is extended or adjusted under 35 U.S.C. 154(b) by 0 days.

(21) Appl. No.: 09/726,440

(22) Filed: Dec. 1, 2000

Related U.S. Application Data
(60) Provisional application No. 60/232,435, filed on Sep. 14, 2000.

(51) Int. Cl.⁷ .................................................. A47J 37/10
(52) U.S. Cl. .......................... 99/339; 99/340; 99/423; 99/448
(58) Field of Search .................... 99/422, 423, 425, 99/445, 340, 339, 448

(56) References Cited

U.S. PATENT DOCUMENTS

| | | | |
|---|---|---|---|
| 4,800,865 A | 1/1989 | Setzer | 126/21 R |
| 5,465,654 A | 11/1995 | Lampi et al. | 99/422 |
| 5,579,680 A | 12/1996 | Graur | 99/401 |
| 5,606,905 A | 3/1997 | Boehm et al. | 99/375 |
| 5,829,361 A | 11/1998 | Richter | 99/422 |
| 5,845,562 A | 12/1998 | Deni et al. | 99/375 |
| 5,967,022 A | * 10/1999 | Moschella | 99/339 |
| 6,016,741 A | 1/2000 | Tsai et al. | 99/341 |

FOREIGN PATENT DOCUMENTS

| | | | | |
|---|---|---|---|---|
| DE | 3624283 | * | 1/1988 | 99/422 |
| EP | 0091145 | * | 10/1983 | 99/422 |
| EP | 0623303 | * | 11/1994 | 99/422 |
| GB | 2127280 | * | 4/1984 | 99/422 |

* cited by examiner

*Primary Examiner*—Reginald L. Alexander
(74) *Attorney, Agent, or Firm*—Law Offices of Royal W. Craig (57) ABSTRACT

An electric grill comprising a large planar surface with shallow sides defining a first cooking surface and an adjustable grillpan carrying a second cooking surface. The first cooking surface is smooth and flat suitable for cooking or grilling foods. The second cooking surface comprises a plurality of parallel ribs along its surface, and is adapted for grilling foods. Sloped channels between the ribs carry grease away from the food while it cooks. A reservoir on the downside of the sloping surface collects the run-off. The parallel ribs are flat on top but are deeper as the channels approach the reservoir. Placement of the grillpan within the structure comprising the first cooking surface generates three separate cooking compartments. Juices from different foods cooked simultaneously on the three respective grill surfaces are thereby prevented from mixing. The grillpan slides laterally in either direction over the first cooking surface, whereby the dimensions of the individual cooking compartments may be changed. A thermostat control dial and on/off control enable the user to select a desired temperature for the cooking surfaces depending on the requirements of the food being cooked. The separate cooking surfaces of the grill enable the user to simultaneously prepare large portions of as many as three different foods without sacrificing any loss of flavor as a result of unwanted mingling of juices.

17 Claims, 5 Drawing Sheets